(12) United States Patent
Doyle et al.

(10) Patent No.: US 8,794,892 B1
(45) Date of Patent: Aug. 5, 2014

(54) TORQUE NUT ASSEMBLY

(75) Inventors: Christopher J. Doyle, Panama City, FL (US); Felipe A. Garcia, Panama City, FL (US); Robert C. Woodall, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 453 days.

(21) Appl. No.: 13/135,328

(22) Filed: Jun. 21, 2011

(51) Int. Cl.
*F16B 37/10* (2006.01)
*F16B 37/08* (2006.01)

(52) U.S. Cl.
CPC ......... *F16B 37/0892* (2013.01); *F13B 37/0864* (2013.01); *F16B 37/0821* (2013.01)
USPC ............................. 411/433; 411/431; 411/540

(58) Field of Classification Search
USPC .............. 411/108, 429, 432–433, 270, 372.5, 411/372.6, 373, 377, 431, 540
See application file for complete search history.

(56) References Cited

U.S. PATENT DOCUMENTS

| | | | | |
|---|---|---|---|---|
| 256,525 A * | 4/1882 | Whiting | .................. | 24/31 R |
| 730,599 A * | 6/1903 | Bartley | .................. | 411/270 |
| 764,662 A * | 7/1904 | Gibbs | .................. | 411/270 |
| 2,043,274 A * | 6/1936 | Wegner | .................. | 81/53.2 |
| 2,664,023 A * | 12/1953 | Mugford | .................. | 411/433 |
| 3,054,145 A * | 9/1962 | Helpa | .................. | 264/318 |
| 3,058,386 A * | 10/1962 | Morrow | .................. | 411/511 |
| 3,952,626 A * | 4/1976 | Townsend | .................. | 411/433 |
| 4,274,323 A * | 6/1981 | Resnicow | .................. | 411/433 |
| 4,462,731 A * | 7/1984 | Rovinsky et al. | .................. | 411/433 |
| 4,657,458 A * | 4/1987 | Wollar et al. | .................. | 411/182 |
| 4,901,958 A * | 2/1990 | Kelso | .................. | 248/59 |
| 5,000,640 A * | 3/1991 | Haas, Jr. | .................. | 411/432 |
| 5,027,671 A * | 7/1991 | Erikson et al. | .................. | 74/441 |
| 5,139,381 A * | 8/1992 | Lubreski et al. | .................. | 411/433 |
| 5,340,252 A * | 8/1994 | Weddendorf | .................. | 411/267 |
| 5,350,266 A * | 9/1994 | Espey et al. | .................. | 411/431 |
| 5,377,395 A * | 1/1995 | Maier et al. | .................. | 27/2 |
| 5,624,218 A * | 4/1997 | Dauwalter | .................. | 411/87 |
| 6,240,798 B1 * | 6/2001 | Erikson et al. | .................. | 74/424.81 |
| 6,666,639 B2 * | 12/2003 | Van Gent | .................. | 411/432 |
| 6,712,574 B1 * | 3/2004 | Roopnarine | .................. | 411/433 |
| 6,821,070 B1 * | 11/2004 | Thompson | .................. | 411/433 |
| 6,997,085 B2 * | 2/2006 | Yamamoto | .................. | 81/121.1 |
| 7,661,915 B2 * | 2/2010 | Whipple | .................. | 411/151 |
| 7,934,896 B2 * | 5/2011 | Schnier | .................. | 411/433 |
| 8,028,594 B2 * | 10/2011 | Schroeder | .................. | 74/89.42 |
| 8,142,127 B1 * | 3/2012 | Doyle et al. | .................. | 411/433 |
| 8,540,471 B2 * | 9/2013 | Dvorak | .................. | 411/433 |
| 2002/0164227 A1 * | 11/2002 | Van Gent | .................. | 411/432 |
| 2008/0080956 A1 * | 4/2008 | Whipple | .................. | 411/433 |
| 2009/0053010 A1 * | 2/2009 | Schnier | .................. | 411/433 |

* cited by examiner

*Primary Examiner* — Flemming Saether
(74) *Attorney, Agent, or Firm* — James T. Shepherd

(57) ABSTRACT

A torque nut assembly includes a multiple-piece nut body and a cap. The nut body can be positioned to define a threaded axial passage, and can expand radially to open the threaded axial passage. The cap is shaped and sized to substantially engage the nut body when the threaded axial passage is so-defined. The cap is locked to the nut body when the cap is engaged thereon.

6 Claims, 2 Drawing Sheets

TORQUE NUT ASSEMBLY

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to torque nuts, and more particularly to a torque nut assembly that can be quickly coupled to or uncoupled from a threaded fastener without requiring the threading or unthreading thereof.

BACKGROUND OF THE INVENTION

Threaded torque nuts and threaded bolt/screws are used in combination to fasten a wide variety of parts. However, the length of a bolt and/or thread density per unit length can greatly affect the amount of time it takes to screw a nut onto a bolt or unscrew a nut from a bolt. In applications where this service operation needs to be performed quickly, the use of conventional threaded nuts and bolts can have a considerable impact on service turnaround times.

SUMMARY OF THE INVENTION

Accordingly, it is an object of the present invention to provide a torque nut assembly that can be rapidly installed on a threaded fastener and removed therefrom.

Another object of the present invention is to provide a torque nut assembly that can be rapidly installed on a bolt, tightened to a specified torque, and be rapidly removed from its torqued position on the bolt.

Other objects and advantages of the present invention will become more obvious hereinafter in the specification and drawings.

In accordance with the present invention, a torque nut assembly includes a nut body and a cap. The nut body has multiple pieces positionable to define a threaded axial passage. The nut body is also separable along at least one axial portion thereof such that the nut body can expand radially to open the threaded axial passage. The cap is shaped and sized to substantially engage the nut body when the threaded axial passage is so-defined. The cap is locked to the nut body when the cap is engaged thereon.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
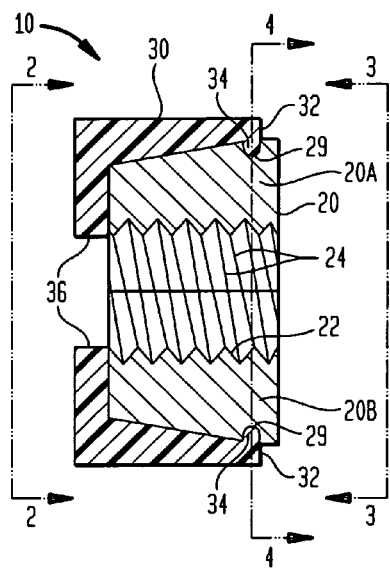
FIG. 1 is a cross-sectional view of a torque nut assembly in accordance with an embodiment of the present invention.
Figure 2:
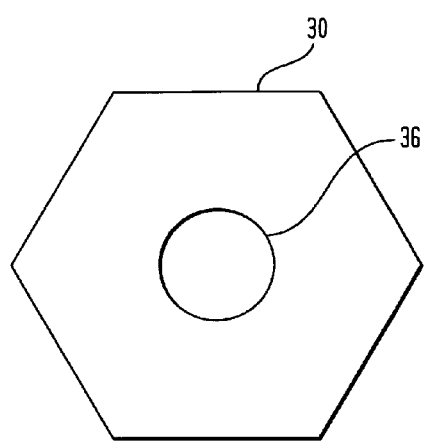
FIG. 2 is an axial end view of the torque nut assembly taken along line 2-2 in FIG. 1.
Figure 3:
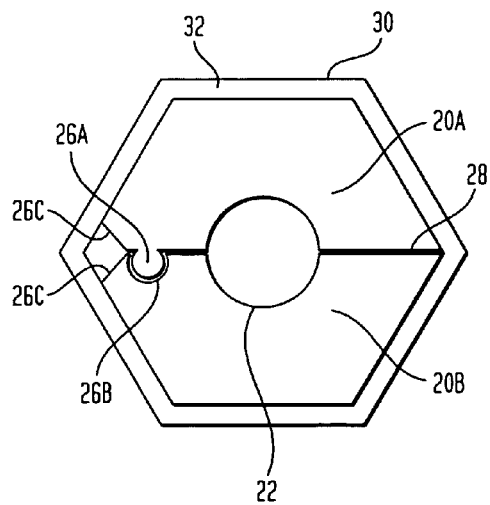
FIG. 3 is an axial end view of the torque nut assembly taken along line 3-3 in FIG. 1.
Figure 4:
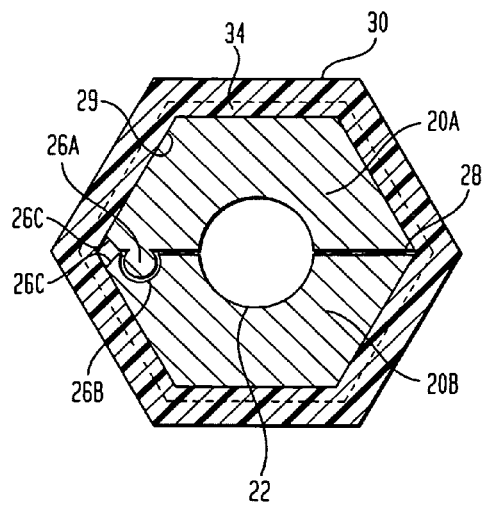
FIG. 4 is a cross-sectional view of the torque nut assembly taken along line 4-4 in FIG. 1.

Referring now to the drawings, simultaneous reference will be made to FIGS. 1-4 where different views of a torque nut assembly in accordance with an embodiment of the present invention are shown. The torque nut assembly is referenced generally by numeral 10. Torque nut assembly 10 can be sized/shaped (e.g., outer size/shape, internal thread density, internal thread pitch, etc.) to work with any threaded fastener (e.g., bolt, threaded shaft, etc.), the choice of which is not a limitation of the present invention. Furthermore, the material used to make torque nut assembly 10 is not a limitation of the present invention. For example, while torque nut assembly 10 might typically be made from metal, the present invention is not so limited as rigid plastics, ceramics, and/or composites could also be used.

Torque nut assembly 10 includes a nut 20 and a nut cap 30 that, in the assembled form shown in FIGS. 1-4, resemble a conventional nut. In the illustrated embodiment, torque nut assembly 10 resembles a hexagonal nut. However, as mentioned above, the present invention is not so limited as the assembly's outer size/shape can be any that permit the gripping thereof by conventional nut-turning tools such as a variety of wrenches, pliers, etc.

In general, nut 20 is formed by multiple sections or pieces that can be positioned to form a body that defines a threaded axial passage therethrough. The threaded axial passage allows nut 20 to function in a conventional fashion, i.e., screwed onto or off a threaded fastener. As will be explained further below, the nut's multiple pieces can also be separated to thereby split open the threaded axial passage so that the nut can quickly be positioned on or removed from a threaded fastener. For simplicity of illustration, nut 20 has two pieces 20A and 20B that can be positioned as shown to define a threaded axial passage 22 having threads 24 defined thereaIong. The thread count, thread depths, and thread pitch angle are not limitations of the present invention. It is also to be understood that more than two pieces can be used to define nut 20.

To simplify handling and use of nut 20, pieces 20A and 20B are coupled together in a hinged fashion. Such hinged coupling is accomplished in the illustrated embodiment by integrally forming a hinge pin 26A in piece 20A and a corresponding pin notch 26B in piece 20B. For example, hinge pin 26A can be formed as a teardrop-shaped protrusion that is matched to a teardrop shaped slot that forms pin notch 26B. Hinge pin 26A and pin notch 26B will typically be formed along the axial length of nut 20. When nut 20 is restrained in a radial fashion by nut cap 30, pieces 20A and 20B mate along a cross-sectional mating plane 28. However, when nut cap 30 is not present, pieces 20A and 20B can separate at mating plane 28 as hinge pin 26A rotates in notch 26B to cause the radial expansion of nut 20 and the splitting open of threaded axial passage 22. Rotation of pin 26A in notch 26B is facilitated by a hinge bevel 26C formed axially along the outer edge of both pieces 20A and 20B adjacent to hinge pin 26A and pin notch 26B, respectively.

Each of pieces 20A and 20B has a slot 29 formed in the outer radial wall thereof. When pieces 20A and 20B are positioned to define threaded axial passage 22, slot 29 on piece 20A aligns with slot 29 on piece 20B so that slot 29 over the entirety of nut 20 defines an annular slot circumscribing the outer radial wall of nut 20.

When pieces 20A and 20B are positioned to define threaded axial passage 22, nut 20 can be tapered along its axial length to facilitate engagement/disengagement by nut cap 30. That is, in the illustrated embodiment, nut cap 30 is correspondingly tapered in terms of its inner diameter in order to positively engage the outer radial walls of nut 20 as will be explained further below. However, this is not a limitation of the present invention as untapered versions of nut 20 and cap 30 can also be used as will be explained further below.

Nut cap 30 is a hollow cap sized/shaped on its interior portions to contact the outer radial walls of nut 20 when threaded axial passage 22 is defined. Thus, in the illustrated example, the interior side walls of cap 30 define a tapered hexagon to slidingly receive nut 20 therein as illustrated. The open end 32 of cap 30 has an annular ridge that extends radially inward. With pieces 20A and 20B positioned to define threaded axial passage 22, cap 30 can be slid axially onto nut 20 until ridge 34 engages slot 29. The parts can be configured as an interference fit that creates a snap or click sound to indicate that the assembly was successful. Cap 30 can be sized such that the engagement of ridge 34 to slot 29 occurs when cap 30 engages an axial end of nut 20. With cap 30 fully engaging nut 20 in this fashion, nut 20 and cap 30 form an integrated assembly 10 that can function as a conventional torque nut.

The present invention also provides for rapid removal of assembly 10 from a threaded fastener (not shown). Specifically, when cap 30 is removed from nut 20, pieces 20A and 20B are free to move (i.e., rotate) radially outward which, in turn, causes threaded axial passage 22 to split open. Removal of cap 30 can be brought about by applying an axial force to open end 32 to force ridge 34 out of engagement with slot 29. This process can be reversed whereby nut 20 is quickly emplaced on a threaded fastener and then cap 30 is slid thereon.

Many nut/bolt combinations require the bolt to extend through the nut. Accordingly, cap 30 can have a hole 36 formed in its axial end such that hole 36 aligns with threaded axial passage 22. The diameter of hole 36 should be equal to or greater than that of threaded axial passage 22 so that a threaded fastener (not shown), can pass through hole 36.

The advantages of the present invention are numerous. The torque nut assembly can be rapidly placed on or removed from a threaded fastener. Once in position, the torque nut assembly can be tightened in the conventional fashion. When it is time to remove the assembly from its tightened state, the nut cap is simply removed and the nut is rapidly separated from the threaded fastener.

Figure 5:
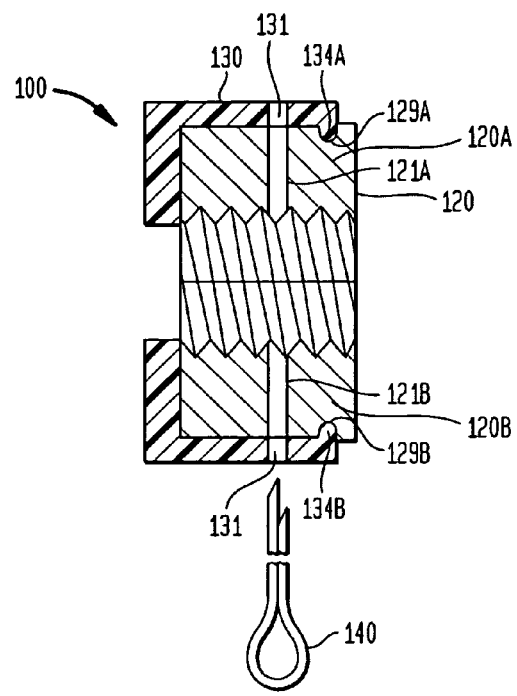
FIG. 5 is a cross-sectional view of a torque nut assembly in accordance with another embodiment of the present invention.

Although the invention has been described relative to a specific embodiment thereof, there are numerous variations and modifications that will be readily apparent to those skilled in the art in light of the above teachings. For example, FIG. 5 illustrates a torque nut assembly 100 in accordance with another embodiment of the present invention. Assembly 100 includes a nut 120, a cap 130 and a locking pin 140. Nut 120 is similar to nut 20 described above except that it (i) has straight (i.e., not tapered) outer radial walls, (ii) has just two opposing slots 129A and 129B formed in the outer radial walls of its pieces 120A and 120B, and (iii) has a locking pin hole 121 that passes through both of pieces 120A and 120B when threaded axial passage 122 is defined. Cap 130 is similar to cap 30 except that it (i) has straight (i.e., not tapered) inner radial walls, (ii) has just two opposing ridges 134A and 134B for engagement with slots 129A and 129B, respectively, and (iii) has a locking pin hole 131 (through at least one radial wall thereof) that will align with locking pin hole 121 when cap 130 engages nut 120. Locking pin 140 (e.g., a cotter pin) engages aligned holes 121/131 as an added locking mechanism to keep assembly 100 in its assembled position. Note that a locking pin could also be used with the embodiment shown in FIGS. 1-4.

Figure 6:
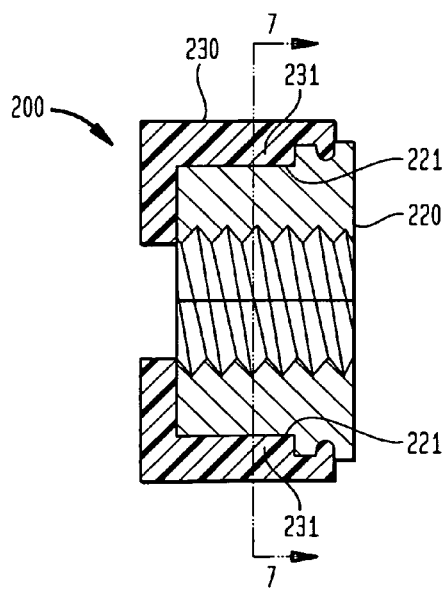
FIG. 6 is a cross-sectional view of a torque nut assembly in accordance with still another embodiment of the present invention.
Figure 7:
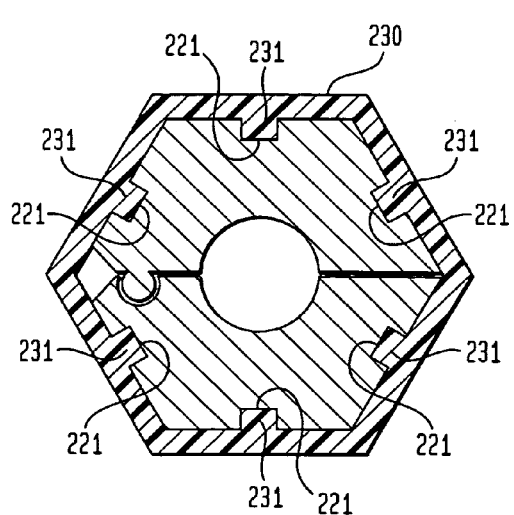
FIG. 7 is a cross-sectional view of the torque nut assembly taken along line 7-7 in FIG. 6.

Another embodiment of the present invention is illustrated in FIGS. 6 and 7 where torque nut assembly 200 includes a nut 220 and a cap 230. Nut 220 has a number of rectangular axially-extending notches 221 formed in its outer radial walls. Cap 230 has a corresponding number of rectangular axially-extending ribs 231 formed on its interior radial walls. The engagement of ribs 231 in notches 221 provides an indexed fit between cap 230 and nut 220. This rectangular rib-to-notch engagement improves the assembly's unitary construction and improves cap-to-nut security in high vibration environments.

It is therefore to be understood that, within the scope of the appended claims, the invention may be practiced other than as specifically described.

What is claimed as new and desired to be secured by Letters Patent of the United States is:

1. A torque nut assembly, comprising:
   a nut body having multiple pieces positionable to define a threaded axial passage, said nut body separable along at least one axial portion thereof wherein said nut body can expand radially to open said threaded axial passage, said nut body having a plurality of outer radial walls, each of said outer radial walls including a portion that is planar with a rectangular axially-extending notch defined therein, said nut body having a continuous annular slot defined in said outer radial walls and circumventing said nut body; and
   a cap shaped and sized to substantially engage said nut body when said threaded axial passage is so-defined, said cap having a plurality of inner radial walls, each of said inner radial walls including a portion that is planar with a rectangular axially-extending rib defined therealong for engaging a corresponding one said rectangular axially-extending notch when said cap engages said nut body, said cap including at least one integrated structure for engaging said slot wherein said cap is retained on said nut body.

2. A torque nut assembly as in claim 1, wherein when said threaded axial passage is so-defined and said cap engages said nut body, said cap is configured to be in contact with an axial end of said nut body and a substantial portion of all exterior radial surfaces of said nut body.

3. A torque nut assembly as in claim 1, further comprising a hole formed in an axial end of said cap wherein, when said cap is engaged on said nut body, said hole is aligned with said threaded axial passage of said nut body, said hole having a diameter that is at least as large as that of said threaded axial passage so-defined.

4. A torque nut assembly as in claim 1, wherein said nut body is tapered along an axial dimension thereof when said threaded axial passage is so-defined.

5. A torque nut assembly as in claim 1, wherein exterior radial surfaces of said cap define a nut configuration.

6. A torque nut assembly as in claim 1, further comprising at least one axial hinge formed in said nut body for hingedly coupling said multiple pieces when said nut body separates along said at least one axial portion thereof.

\* \* \* \* \*